(12) United States Patent
Leavitt et al.

(10) Patent No.: US 11,877,582 B2
(45) Date of Patent: Jan. 23, 2024

(54) AUTOMATED CORDLESS SMOKER

(71) Applicants: Frederick Arlen Leavitt, San Diego, CA (US); Brandon James Leavitt, Mansfield, TX (US); Robert Kirk Jafek, Mesa, AZ (US)

(72) Inventors: Frederick Arlen Leavitt, San Diego, CA (US); Brandon James Leavitt, Mansfield, TX (US); Robert Kirk Jafek, Mesa, AZ (US)

( * ) Notice: Subject to any disclaimer, the term of this patent is extended or adjusted under 35 U.S.C. 154(b) by 245 days.

(21) Appl. No.: 16/974,371

(22) Filed: Aug. 16, 2021

(65) Prior Publication Data

US 2023/0051127 A1  Feb. 16, 2023

(51) Int. Cl.
*A47J 37/07* (2006.01)
*A23B 4/052* (2006.01)
*F24B 13/04* (2006.01)

(52) U.S. Cl.
CPC ........... *A23B 4/052* (2013.01); *A47J 37/0754* (2013.01); *F24B 13/04* (2013.01)

(58) Field of Classification Search
CPC ....... A23B 4/052; A47J 37/0754; F24B 13/04
See application file for complete search history.

(56) References Cited

U.S. PATENT DOCUMENTS 10,670,276 B2 *  6/2020  Traeger ................. F24B 15/005
2017/0343218 A1 * 11/2017  Tucker ................ A47J 37/0704

* cited by examiner

*Primary Examiner* — Alfred Basichas

(57) ABSTRACT

A system for smoking or grilling food that uses a wood pellet burner to provide the heat and smoke for the smoking/grilling process and wherein all the electrical requirements for the system are provided by a thermoelectric generator that receives thermal energy from the wood pellet burner and converts a portion of that thermal energy into electricity, and wherein a microcontroller is used to accurately regulate the smoking or grilling temperatures and the temperatures of the thermoelectric generator.

9 Claims, 2 Drawing Sheets

AUTOMATED CORDLESS SMOKER

BACKGROUND

1. Field of the Invention

The present invention relates generally to smokers, and more specifically, to Pellet Smokers for slow cooking meat.

2. Description of Related Art

Pellet smokers are well known in the art and are an effective means of conveniently slow cooking meat and vegetables in a manner that imparts an appealing smoked flavor to the food and to break down tough connective tissues in the meat to a tender "melt in your mouth" texture. For example, FIG. 1 depicts a conventional wood pellet smoker system 101 having a hopper 102 containing wood pellets 103 which fall into auger 104 which in turn feeds the pellets into burner pot 105. The pellets 106 in burner pot 105 are heated by ignitor 107 until they ignite. Smoke and heat generated from burning pellets 106 heat chamber 108 cooking food resting on rack 109. Combustion air blower 110 directs combustion air into burner pot 105 through air tube 111 to support combustion. Controller 112 controls auger 104, ignitor 107 and combustion air blower 110 to maintain the desired temperature within chamber 108. Proper control of the temperature in chamber 108 together with smoke from burning pellets 106 in burner pot 105 can result in exceptionally tender and deliciously wood smoked meat.

One of the problems commonly associated with system 101 is the need to plug the system into an electrical outlet in order to power auger 104, ignitor 106, blower 110 and controller 111. The need for electrical power necessitates that the smoker be located near an electrical outlet which is may be in a less than ideal location. Locating the smoker in a desirable location often requires the use of an extension cord with is both unsightly and unsafe. Alternatively, expensive renovations can install an electrical outlet near the desired location. To use the system on a picnic or gatherings in remote locations can only be done with the use of noisy and troublesome generators.

An additional problem with the prior art is a long heat up time. Because the burner pot is small, the amount of heat it can produce is limited. It can take up to half an hour for the prior art system to come to temperature. While this may not be a significant problem for a smoking run which can exceed twelve hours, it is frustrating when all you want to do is grill a few hamburgers.

An additional problem with the prior art is the sensitivity of the burner to the quality of the wood pellet fuel. Old pellets, pellets with excess dust and pellets with a high moisture content burn poorly and can clog auger 104 as it feeds the pellets. This can lead to unreliable combustion, failed starts and costly repairs.

Accordingly, although great strides have been made in the area of wood pellet smokers, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and the advantages thereof, will best be understood by reference to the following detailed description when read in conjunction with the accompanying drawings, wherein:

Figure 1:
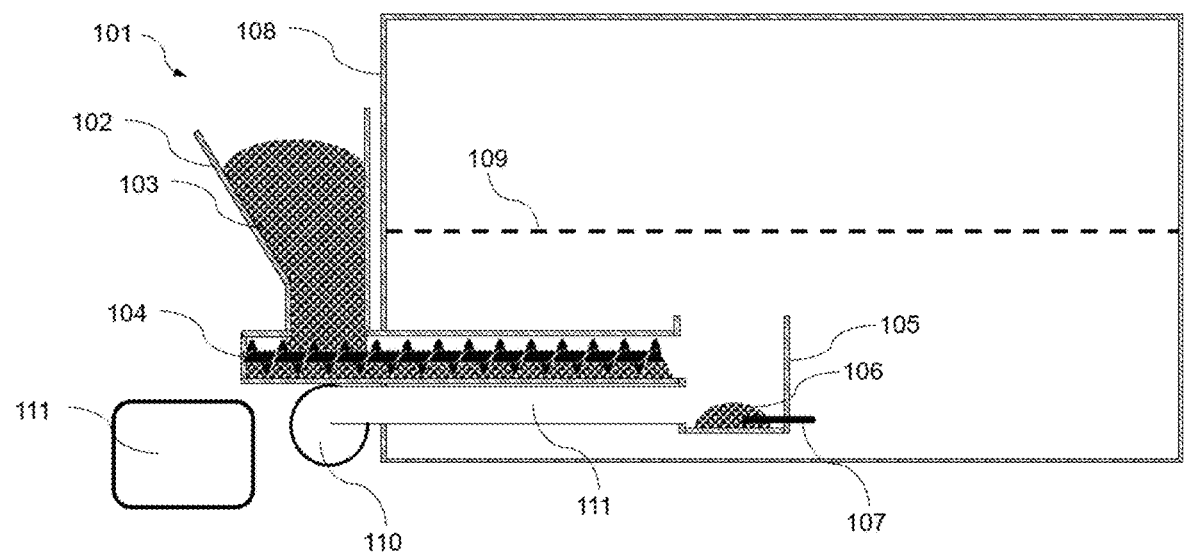
FIG. 1 is a cross sectional view of the prior art system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with conventional wood pellet smoker systems. Specifically, the present application uses a thermoelectric generator (TEG) to convert some of the thermal energy produced by the wood pellet burner into electricity. This electricity is in turn used to power the electrical components described in system 201. The present application also uses the pellet burner described in patent application Ser. No. 16/713,385 Back Drafted Back Fed Pellet Stove. This burner requires less than five watts of electrical power to operate thereby allowing the TEG used to power it to be small and affordable.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
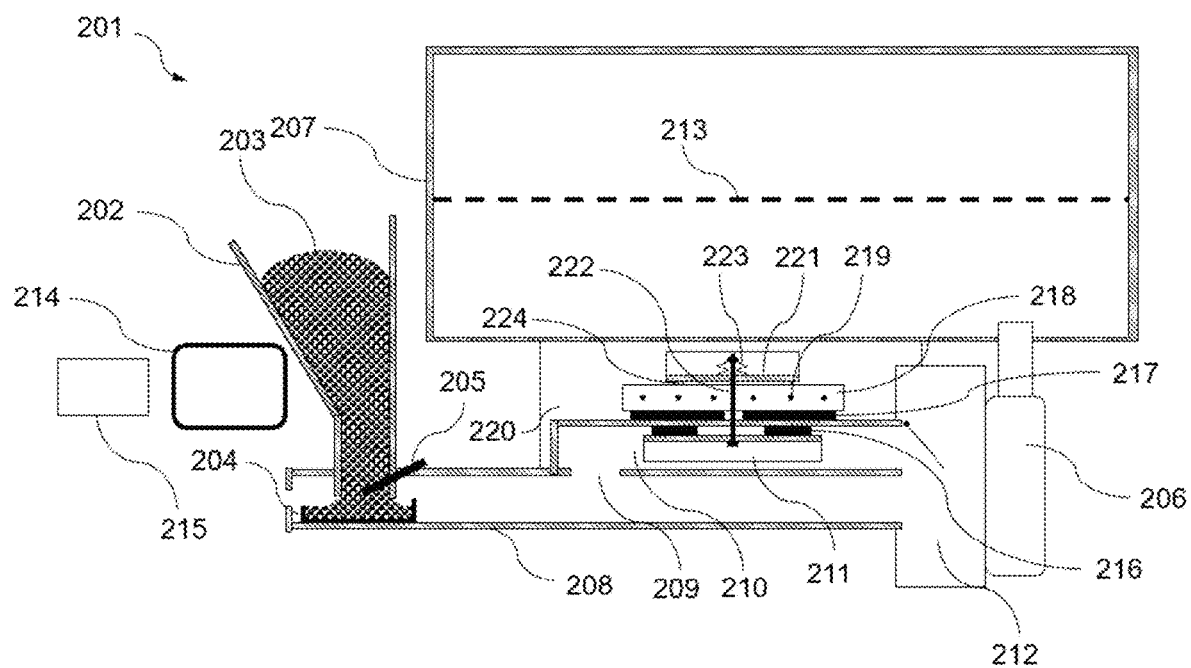
FIG. 2 is a cross sectional view of the present application.

Referring now to the drawings wherein like reference characters identify corresponding or similar elements throughout the several views, FIG. 2 depicts a cross sectional view of an Automated Cordless Smoker system 201 in accordance with a preferred embodiment of the present application. It will be appreciated that system 201 overcomes one or more of the above-listed problems commonly associated with conventional Wood Pellet Smoker systems.

In the contemplated embodiment, system 201 includes a pellet hopper 202 containing wood pellets 203, wherein the pellet hopper is configured to direct and channel the wood pellets into burner pot 204. Burner pot 204 captures the pellets preventing them from spilling out. Ignitor 205 in communication with the hopper, heats the pellets until they begin to burn and is then turned off. Blower 206 draws air through the wood pellets providing combustion air and directs the resultant heat and smoke into smoking chamber 207 from the burner pot. Hot gases and smoke from the pellets burning in burner pot 204 flow through burner tube 208 until it reaches opening 209 leading into heat exchanger tube 210 at which point the flow of gases split with some of the gases flowing through heat exchanger tube 210 and the remaining gases continue down burner tube 208. The hot gases flowing down heat exchanger tube 210 pass through heat exchanger 211 transferring a portion of its thermal energy to heat exchanger 211. The gases from both heat exchanger tube 210 and burner tube 208 collect in exhaust manifold 212 where they are drawn into blower 206 where they are then directed into smoking chamber 207. The meat being cooked rests upon metal grate 213. It should be appreciated that any suitable food product may be used with system 201.

Controller 214 is a programmable controller that allows the user to input the desired temperature for smoking chamber 207 and turns electric blower 206 up or down to maintain the desired temperature in smoking chamber 207. Controller 213 also displays the setpoint and current temperature of smoking chamber 207, the temperature of the meat being smoked and the charge level of battery 215. Additional information regarding the systems operation can also be displayed as desired.

The amount of heat produced by the pellet burner is controlled by the amount of combustion air moved by blower 206. Maximum heat is produced when blower 206 is at maximum speed and minimum heat is produced when blower 206 is low. Extra smoke can be produced by momentarily (up to several minutes) turning blower 206 off.

Thermal energy entering heat exchanger 211 is passed through pressure pads 216 and into two thermoelectric modules (TEM) 217. Heat entering TEM 217 from pressure pads 216 heats the hot surface of TEM 217 to about 250° C. Heat sink 218 draws heat from the cold side of TEM 217 dropping the temperature of that surface to less than 100° C. Heat is removed from heat sink 218 by six heat pipes 219 which pass the removed heat into a number of cooling fins 220. Cooling fins 220 reject the waste heat to the ambient air. Enhanced cooling can be obtained by using a blower to force cool air through the heatsink fins or alternatively, the heat pipes and fins can be eliminated by passing water or some other coolant through the heatsink base.

The temperature difference between the hot side of TEM 217 and the cold side of TEM 217 generates three to five watts of electricity. More or less power is generated depending on the actual temperature difference. This electricity is fed into controller 214 which uses the available electrical power to charge battery 215 and to power blower 206. System 201 is powered by battery 215 until the TEG is producing enough power to charge battery 215. Because ignitor 205 is used to start system 201 all its electrical power necessarily comes from battery 215. This energy is replaced once the TEG is operating.

The TEG components (heat exchanger 211, pressure pads 216, TEM 217 and heat sink 218) are held together by bolt 222 that runs between pressure plate 219 and hot side heat exchanger 211. Disk springs 223 ensure that the clamping pressure is maintained even during extreme dimensional changes that occur as the assembly is thermocycled. It is important to maintain pressure on the TEG assembly to maintain good heat transfer between the components. Raised features 224 create pressure points on heat sink 218 ensuring that the pressure is applied directly over TEM 217 in order to achieve good compression on the stack of components and maximum heat transfer through their interfaces.

Figure 3:
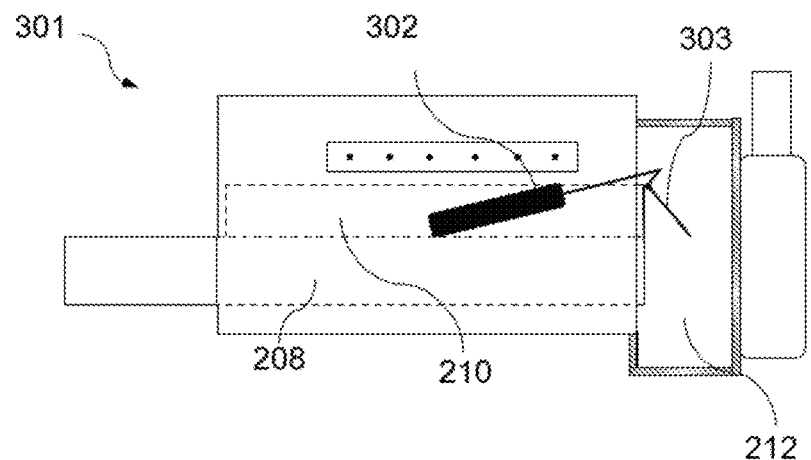
FIG. 3 is a side view of the TEG system illustrating the system used to control the temperature of the thermoelectric generator.

FIG. 3 is a side view of TEG system 301 with a cross section of exhaust manifold 212 to show more detail about how the hot temperature of TEM 217 is maintained. Under normal operation, hot exhaust gases flow down both burner tube 208 and heat exchanger tube 210. This allows enough heat to flow through heat exchanger 211 to maintain proper TEM 217 temperature and sufficient heat to flow through burner tube 208 to maintain proper smoker chamber 207 temperature. In some cases, when a very high smoker chamber 207 temperature is desired for grilling, it is possible to overheat TEM 217. If controller 214 detects excessive temperatures on TEM 217 it will activate actuator 302 closing damper 303 to block the flow of hot gases through heat exchanger tube 210 preventing the hot side temperature of TEM 217 from exceeding safe limits. Once the temperature of TEM 217 falls to a safe level, actuator 302 will reopen damper 303. Alternatively, if the heat balance is such that TEM 217 temperatures are typically too low, damper 303 can be positioned so as to block burner tube 208 thereby directing more hot gases through heat exchanger tube 210 which will increase the temperature of TEM 217.

Figure 4:
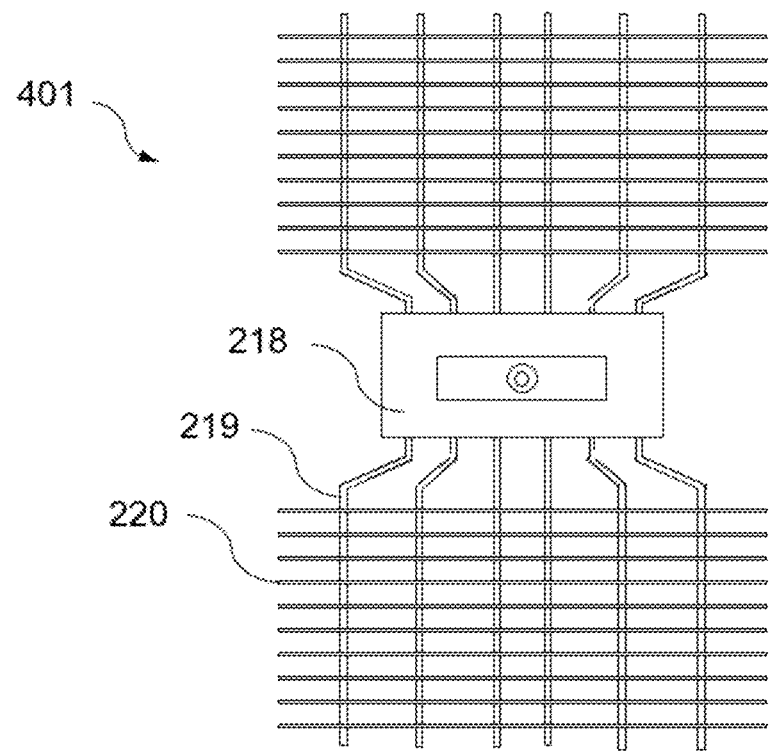
FIG. 4 is a top view of the cooling system used to reject heat from the thermoelectric generator.

FIG. 4 is a top view of Heat Sink Assembly 401 used to reject heat from TEG 301. In this view, heat sink 218 is seen in the center of the figure with six heat pipes 219 passing through heat sink 218. Heat pipes 219 then pass through a number of cooling fins 220 on either side of the heat sink. Cooling fins 220 reject the thermal energy from TEG 301 to ambient air.

It should be appreciated that one of the unique features believed characteristic of the present application is the ability of TEG 301 to generate enough electricity to recharge battery 214 and to power blower 206 allowing the system to operate with no external source of electricity.

Another unique feature is the ability of the burner described in patent application Ser. No. 16/713,385 to combust low quality wood pellet fuel and wood pellet fuel with high moisture content.

Another unique feature of the present application is the high turn down ratio of the burner described in patent application Ser. No. 16/713,385 that allows the burner to quickly come to temperature and then turn down to a low level to maintain proper smoking temperatures.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A smoker system, comprising:
   a pellet hopper configured to hold pellets and direct the pellets into a burner pot;
   an ignitor in communication with the pellet hopper and configured to heat the pellets as they are channeled from the pellet hopper to the burner pot;
   a smoking chamber in gaseous communication with the burner pot, the smoking chamber configured to receive heat and smoke from the burner pot;
   a heat exchanger in gaseous communication with the heat and smoke from the burner pot; and
   one or more thermoelectric modules configured to receive thermal energy from the heat exchanger;
   wherein the one or more thermoelectric modules provide energy to charge a battery;
   wherein the smoking chamber is configured to receive a food product for cooking via the heat and smoke; and
   wherein the one or more thermoelectric modules provide enough energy to eliminate the need for alternative power sources.

2. The system of claim 1, further comprising:
   a burner tube in gaseous communication with the burner pot;
   an opening from the burner tube and into a heat exchanger tube, the heat exchanger tube housing a heat exchanger;
   an exhaust manifold in gaseous communication with the burner tube and the heat exchanger tube; and
   a blower in gaseous communication with the exhaust manifold and configured to receive gasses therefrom;
   wherein the blower directs gasses and heat into the smoking chamber.

3. The system of claim 2, wherein the battery is used for powering the blower via a programmable controller.

4. The system of claim 1, further comprising:
   a programmable controller configured to receive user input to maintain a desired temperature within the smoking chamber.

5. The system of claim 4, wherein the programmable controller includes a display configured to display a current temperature and a setpoint temperature.

6. The system of claim 1, wherein the one or more thermoelectric modules receive thermal energy from the heat exchanger via one or more pressure pads.

7. The system of claim 1, wherein the one or more thermoelectric modules further comprise:
   a hot surface; and
   a heat sink;
   wherein heat is removed from the heat sink via a plurality of heat pipes which pass through one or more cooling fins;
   wherein the cooling fins reject waste heat to ambient air.

8. The system of claim 7, wherein the heat sink is centered among the plurality of heat pipes, the plurality of heat pipes passing through the heat sink and then through a plurality of cooling fins.

9. The system of claim 7, wherein the hot surface is regulated by a programmable controller that causes hot air to bypass the thermoelectric generator if the temperature of the thermoelectric generator is too high.

* * * * *